United States Patent
Filmer et al.

(10) Patent No.: US 11,946,214 B2
(45) Date of Patent: Apr. 2, 2024

(54) TAILINGS DEPOSITION

(71) Applicant: Anglo American Technical & Sustainability Services, Ltd., London (GB)

(72) Inventors: Anthony Owen Filmer, Kangaroo Point (AU); Daniel John Alexander, St Albans (GB); Julian Jeremy Soles, Henley-on-Thames (GB); Philip Duncan Newman, Guildford (GB)

(73) Assignee: ANGLO AMERICAN SERVICES (UK) LTD, London (GB)

( * ) Notice: Subject to any disclaimer, the term of this patent is extended or adjusted under 35 U.S.C. 154(b) by 637 days.

(21) Appl. No.: 16/811,043

(22) Filed: Mar. 6, 2020

(65) Prior Publication Data
US 2020/0283324 A1 Sep. 10, 2020

Related U.S. Application Data

(60) Provisional application No. 62/848,911, filed on May 16, 2019, provisional application No. 62/815,503, filed on Mar. 8, 2019.

(51) Int. Cl.
 *C02F 11/16* (2006.01)
 *B03B 5/30* (2006.01)
 (Continued)

(52) U.S. Cl.
 CPC .............. *E02B 11/00* (2013.01); *B03B 5/30* (2013.01); *B09B 1/00* (2013.01)

(58) Field of Classification Search
 CPC ..... B01D 2221/04; B01D 24/12; C02F 3/046; B09B 1/00; E02B 11/00
 See application file for complete search history.

(56) References Cited

U.S. PATENT DOCUMENTS

| | | | |
|---|---|---|---|
| 3,767,050 A | 10/1973 | Reiner | |
| 4,102,786 A * | 7/1978 | Okada | B01D 24/12 210/275 |

(Continued)

FOREIGN PATENT DOCUMENTS

| | | |
|---|---|---|
| CA | 2 606 312 | 4/2009 |
| WO | WO 2017/195008 | 11/2017 |

(Continued)

OTHER PUBLICATIONS

H.M.M. Rafael et al, "Static Liquefaction Analysis of the Limonar Tailings Dam in Peru", Springer International Publishing, Numerical Analysis of Nonlinear Coupled Problems, Sustainable Civil Infrastructures, 1, Aug. 2018, DOI: 10.1007/978-3-319-61905-7_5.

(Continued)

*Primary Examiner* — Benjamin F Fiorello
(74) *Attorney, Agent, or Firm* — NIXON PEABODY LLP; Jeffrey L. Costellia

(57) ABSTRACT

THIS invention relates to a method of disposing of residues from the comminution and processing of ores. The method includes the steps of classifying the processing residues into a water permeable sand fraction and a tailings fraction and depositing the tailings fraction and the sand fraction to form a multilayer structure contained by at least one containment wall (14) with the sand fraction forming continuous channels (12) through the tailings fraction (10) to allow water contained in the tailings and sand to flow by gravity, through the sand channels, to water discharge points (16), and recovering the water (18) from the water discharge points.

36 Claims, 3 Drawing Sheets

(51) Int. Cl.
  *B09B 1/00*   (2006.01)
  *E02B 11/00*  (2006.01)

(56) References Cited

U.S. PATENT DOCUMENTS

| | | | |
|---|---|---|---|
| 4,448,690 A | 5/1984 | Maphis | |
| 4,529,497 A * | 7/1985 | Watson | B09B 1/00 34/518 |
| 4,541,752 A | 9/1985 | Phillips | |
| 4,995,969 A * | 2/1991 | LaVigne | C02F 3/046 210/150 |
| 5,413,433 A | 5/1995 | Davies | |
| 7,510,649 B1 * | 3/2009 | Lavigne | C02F 3/046 210/151 |
| 9,188,389 B2 | 11/2015 | Ren | |
| 2006/0188980 A1* | 8/2006 | Holtzapple | B09B 3/00 435/290.4 |
| 2006/0222463 A1* | 10/2006 | Subbarayan | B09B 3/00 405/129.85 |
| 2011/0100905 A1* | 5/2011 | Ahn | C02F 1/42 210/151 |
| 2014/0119832 A1 | 5/2014 | Mikula et al. | |
| 2014/0305001 A1 | 10/2014 | Ren et al. | |
| 2020/0283324 A1 | 9/2020 | Filmer et al. | |

FOREIGN PATENT DOCUMENTS

| | | |
|---|---|---|
| WO | WO-2017/195008 A1 | 11/2017 |
| WO | WO 2018/234880 | 12/2018 |

OTHER PUBLICATIONS

B. Bussiere, "Colloquium 2004: Hydrogeotechnical properties of hard rock tailings from metal mines and emerging geoenvironmental disposal approaches", Canadian Geotechnical Journal, 1, vol. 44, 1019-1052, Oct. 17, 2007, DOI: 10.1139/T07-040.

E.J. Klohn, "Seepage Control for Tailings Dams", Tailings and Waste Disposal—Seepage, Contamination, Regulations, and Control, SECTION 4, 1st International Conference on Mine Drainage, San Francisco, CA, May 1, 1979.

Https://reviewboard.ca/upload/project_document/EA0809-004_Co-disposal_Case_Histories.PDF, "Co-Disposal Practices in Mine Waste Management, Technical Memorandum", pp. 1-48, Feb. 8, 2012.

International Search Report (Application No. PCT/IB2020/051942) dated Nov. 19, 2020.

Bryan Ulrich et al., "Combined Tailings and Mine Waste", Proceedings Tailings and Mine Waste 2015, Vancouver, BC, Oct. 26 to 28, 2015, pp. 1-11.

\* cited by examiner

TAILINGS DEPOSITION

BACKGROUND OF THE INVENTION

This invention relates to a method to recover water and form stable landforms from mine tailings.

Most of the water consumed in a hard rock mining operation, such as that for base or precious metal recovery, is contained in the very finely ground flotation or leach tailings. The fine grinding is required to liberate the valuable component in the ore, to achieve satisfactory recoveries. The resulting tailings are thickened for partial recovery of the water, and because the thickened slurry remains subject to liquefaction, are hydraulically deposited in purpose-built dams termed tailings storage facilities (TSF).

Tailings particles are typically less than 150 microns in diameter, and due to their low permeability cannot be readily drained or filtered to remove the entrained water.

Even where tailings filtration is practiced, the stacking and storage of the filtered product can be problematic, as the filtered tailings are difficult to handle and lack structural integrity. Filtration and mechanical stacking are both high cost operations, and still generate a residue which remains difficult to store in many terrains.

So, two long-held objectives of the hard rock mining industry such as copper or gold or PGMs or other base metals are firstly to recover the water consumed in the tailings, and secondly to find a low-cost method for stacking tailings in a dry and stable form.

The agricultural, construction and land stabilisation industries, have long used the concept of wicking to dewater low hydraulic conductivity soils.

A wick drain (either vertical and lateral) is created by inserting a continuous layer of higher hydraulic conductivity material into the poorly drained soil, to allow water to transfer from the areas of low hydraulic conductivity soil to the more porous drain, from which it can flow to a point where it can be discharged. Most wick drains use a water permeable geotextile wrapped around a central porous core, to enable selective flow of water from the saturated soil into the porous wick.

Sand is also used as the wicking material (often termed French drains), because it has a high hydraulic conductivity (around 2 orders of magnitude greater than the poorly drained soil). A sand channel enables steady drainage from the low conductivity soil (e.g. clay) into the sand drain, from where it can flow to a dewatering point. The wicking effect of the unsaturated sand appears to 'draw water out' from the surrounding saturated soil.

For dewatering mine tailings, similar wicking principles can apply.

However, the size distribution of the mine tailings is such that they have a low hydraulic conductivity (typically $10^{-4}$ to $10^{-6}$ cm/sec) and hence, when present in any large volume, remain 'permanently' above saturation; the water content at which liquefaction of the tailings may occur if an external stress is applied.

The final water content of the settled tailings is typically around 0.5-0.55 m3 water per tonne tailings.

Indeed, in many jurisdictions, authorities insist on an impermeable liner to the base and sides of the tailings storage facility (TSF) to prevent ongoing water leakage from the TSF to the surrounding environment.

Due to the volumes involved, the occasional failures of containment walls of the TSFs used for containing mining residues, are potentially catastrophic. Such failures have caused loss of life and large-scale environmental damage.

The concept of utilising vertical wick drains using geotextile materials to dewater tailings has been successfully trialled for the consolidation of historical tailings to enable relocation of the partially dried material (Proceedings Tailings and Mine Waste 2015 Vancouver, BC, Oct. 26 to 28, 2015). However, the cost of installing a very large number of vertical wick drains, at a spacing of 1-3 metres across a large tailings storage facility, is prohibitive. The materials cost of each conventional geotextile wick drain is significant, as is the cost of placement of each drain.

The closest commercial application to the concept of a wick drain in tailings storage is a layer of sand or engineered drainage channels which are routinely placed on liners at the base of the TSF, to enable water to transfer laterally to a dewatering pump location. However, over an extended period, the effective rate of dewatering of the TSF from the sand at the base of the dam is limited. Only the few metres adjacent to these drainage pathways dewater, due to the low hydraulic conductivity of the many metres of overlying tailings, and the inability of air access to displace the water contained in the tailings.

So, wicking has not progressed across the mining industry, even in those TSF locations where the water that could be recovered has significant value.

A similar concept of providing a high permeability layer to assist in dewatering a thinner low permeability tailings layer located above, is in belt filtration, as claimed by Bentley et al. (U.S. Pat. No. 3,767,050A). The filtration of a low permeability tailings slurry is accelerated by placing the tailings on an underlying layer of sand.

In another similar concept, Ren et al (U.S. Pat. No. 9,188,389 B2) distribute continuous parallel layers of fine oil sand tailings by gravity over layers of another higher permeability base material such as sand obtained from the oil sand refining process, to increase the structural integrity of the fine tailings.

To maintain these parallel layers of tailings and sand, which are deposited hydraulically and flow by gravity over an extended area, the respective slurries are chemically treated prior to deposition. This chemical treatment matches the beaching angles of the sand and tailings fractions, to maintain a uniform depth of the two fractions of the structure, and to match this angle with the slope of the terrain in which the deposition is planned. This beaching angle is typically greater than 1%, with the upper and lower limits being constrained by the adjustments achievable through the chemical modification of the respective slurries. The achievable layer thickness in the layered structure, typically less than 1 m, and is constrained by a threshold dewatering period required to reach the desired shear strength, prior to the addition of the next layer. During this threshold dewatering time, the higher permeability layer partially drains, providing an unsaturated base which is available to partially dewater the overlying low permeability layer, thus enhancing the shear strength of the composite structure.

Separately, coarse beneficiation technologies are under development to reject gangue at a coarser size. These coarse beneficiation technologies include techniques such as coarse particle flotation (CPF) and leaching of the very coarse CPF residue to recover the valuable component of ores into a more concentrated form, at a coarser grind size.

This residual sand from CPF or the sand heap leach (SHL) has a metal content similar to conventional tailings and hence is assigned to permanent disposal rather than finer comminution. This ability to produce coarser residues, without sacrificing recovery, opens an option for partial water recovery from the resultant sand residue. For example, the increase in grind size using CPF generates a separate gangue stream which can be deposited as a high permeability, free draining sand residue.

The CPF sand residue can be separately stacked and drained to dewater to around 90% solids (WO2017/195008), or alternatively mixed with a proportion of the conventional tailings to incorporate as much as possible of the tailings into the sand, whilst still maintaining stack stability (WO2018/234880).

Because CPF recovery still relies on partial exposure of the valuable minerals and liberation of gangue during grinding, adequate exposure of the desired mineral occurs only once the ore has been ground to be less than the size of a medium sand (typically around 3-500 micron). When the upper end of the size distribution is at this size where high recovery can be achieved in CPF, around 50%-70% of the milled ore is already milled to a size consistent with conventional tailings. So, even with blending of CPF sand and tailings claimed in WO2018/234880, either recovery must be sacrificed to achieve a free draining blend, or only partial disposal of the tailings can be achieved by blending. Thus, the issue of storage of tailings remains.

SUMMARY OF THE INVENTION

This invention relates to a method of disposing of residues from the comminution and processing of ores, including the steps of:
- classifying the processing residues into a water permeable sand fraction and a tailings fraction;
- depositing the tailings fraction and the sand fraction to form a multilayer structure contained by at least one containment wall with the sand fraction forming continuous channels through the tailings fraction to allow water contained in the tailings and sand to flow by gravity, through the sand channels, to water discharge points; and
- recovering the water from the water discharge points.

A containment wall is a man-made or natural barrier, constructed of permeable or impermeable materials, that contains the deposited tailings layers, such as to allow the subsequent placement of sand channels and dewatering of the tailings layer.

Once deposited, sand channels are covered by a layer of tailings that are deposited hydraulically.

The sand fraction typically comprises sand particles with a p80 of greater than 150 microns and preferably greater than 300 microns, and even more preferably greater than 400 microns, up to 3000 microns, and is free-draining.

By free-draining is meant that the sands will drain to an unsaturated state under the influence of gravity alone and preferably possess the ability to be hydraulically stacked to any height and have the water drain by gravity to form an unsaturated sand, typically containing less than 15% water by weight.

The tailings fraction typically comprises particles with a p80 of less than 200 microns, typically less than 150 microns, and has a typical water content of between 30 and 70% by weight (0.55-0.90 m3 water per m3 of tailings slurry) depending on the upstream tailings handling systems.

The tailings fraction may be treated with chemical additives such as flocculants, prior to deposition, to create a more permeable tailings layer, or change the natural beaching angle.

Preferably, at least 50% of the sand residue is in the particle size range from 0.1 to 1 mm, and preferably more than 70% and even more preferably more than 90%.

Preferably, the sand residue contains less than 25% sub 0.75 mm material, and preferably less than 15%, and even more preferably less than 10%.

The final tailings and or the sand may be partially dewatered prior to deposition.

In a process of the invention, a tailings layer is deposited hydraulically and dewatering takes place into the sand channels until the tailings layer reaches a structural integrity suitable for placement of a sand channel or channels on the surface of the tailings layer, whereafter the next layer of tailings is placed hydraulically over the sand channel/s, and the process continues to build a multilayer structure.

The sand channels may be placed hydraulically or placed mechanically as a drained solid.

The sand channels may be placed as a base on the previous tailings layer to enable mechanical equipment to complete the sand placement across the full tailings surface.

A previous tailings layer may be partially dewatered either by drainage through the previous sand channels, or by a mechanical extrusion machine, prior to placement of the next sand channels Sand channels may be placed from a floating vessel on the top of a subaqueous tailings storage facility.

In one embodiment the containment wall at the water recovery end of the structure is permeable and water drains from the discharge points through the wall.

In another embodiment of the invention, the containment wall at the water recovery end of the structure is not water permeable and water is removed from the contained structure by pumping from a central water discharge point.

Preferably, air access points are provided for the sand channels, either at the deposition end of the structure or by any other means of connection to the air.

Typically, the sand channels are placed such that the maximum distance from any point in the tailings to the nearest sand channel is less than 10 metres, and preferably less than 3 metres, and even more preferably less than 2 metres.

The sand channels may be connected vertically and laterally, to create a 3-dimensional matrix of permeable channels within the tailings.

The sand channels may be between 0.05 and 2 m in depth, preferably between 0.2 and 1 m in depth and even more preferably between 0.3 and 0.7 m depth.

In construction, the continuous sand channels are deposited across the top of a tailings layer.

Typically, the tailings fraction is deposited hydraulically to provide a beaching angle of about 0.5% to 2%, typically 0.5% to 1%, preferably at around 0.5% to provide an adequate slope for the subsequent gravity flow of water through the sand channels to the discharge point.

In one embodiment of the invention, the sand fractions and tailings fractions are deposited sequentially in layers, to form tailings layers that are 1 to 10 m thick, and sand channels that are on average 0.05 to 2 m thick.

In another embodiment of the invention, the sand fractions are deposited in discrete rows spaced apart, and tailings fractions are deposited sequentially in layers, to form tailings layers that are 1 to 10 m thick, and sand channels that are 0.05 to 2 m, typically 0.05 to 1 m thick, and spaced apart by 2 to 10 m, typically 2 to 5 m.

In a further embodiment of the invention, sand is deposited, or geotextile wicking drains or equivalent are placed, such as to form vertical wicking drains in the tailings layers between upper and lower sand channels. For example, this can be achieved during construction by overlaying some or all of the sand channels, such that they form a continuous vertical column of sand through the tailings. It can also be achieved by introducing geotextile based wick drains to interconnect the sand channels.

In another embodiment of the invention, sand is used to build internal and external sand bunds. The bunds can be subdivided to form separate containment paddocks, and each paddock is then filled by hydraulic deposition of tailings to the appropriate height, and water allowed to drain into the underlying sand channels and out through the permeable sand bunds to the water catchment point. Then the whole process of placing sand channels and raising the bunds is repeated, to eventually form the desired height and shape of sand and tailings structure.

Preferably, in the process, at any time, only the top 3 tailings layers, and preferably the top two tailings layers, and even more preferably the top tailings layer, are saturated with water i.e tailings in which air has not yet displaced at least some of the pore space that exists between the solid particles, such that they remain subject to liquefaction in the event of an applied stress. A saturated soil is one in which the pore spaces are filled with water.

The sand channels may be inserted in an existing mine tailings storage facility to promote consolidation of the tailings near the containment wall The sand is preferably generated by a separate coarse beneficiation process and the tailings is generated from conventional flotation of the ore.

The coarse beneficiation process may be a coarse particle flotation, screening, gravity separation, electrostatic separation, and magnetic separation, typically coarse particle flotation.

Alternatively, the sand is generated from sand heap leaching, and the tailings is generated from conventional agitation leaching.

The invention also covers a mine tailings dewatering site comprising:
at least one containment wall;
a multilayer structure contained by the containment wall, said multilayer structure comprising tailings fractions and sand fractions, with the sand fractions forming continuous channels through the tailings fractions, to allow water contained in the tailings and sand to flow by gravity through the sand channels; and
water discharge points.

The sand fraction typically comprises sand particles with a p80 of greater than 150 microns and preferably greater than 300 microns, and even more preferably greater than 400 microns, up to 3000 microns, and is free-draining.

By free-draining is meant that the sands will drain to an unsaturated state under the influence of gravity alone and preferably possess the ability to be hydraulically stacked to any height and have the water drain by gravity to form an unsaturated sand, typically containing less than 15% water by weight.

The tailings fraction typically comprises particles with a p80 of less than 200 microns, typically less than 150 microns, and has a typical water content of between 30 and 70% by weight (0.55-0.90 m3 water per m3 of tailings slurry) depending on the upstream tailings handling systems.

Preferably, at least 50% of the sand residue is in the particle size range from 0.1 to 1 mm, and preferably more than 70% and even more preferably more than 90%.

Preferably, the sand residue contains less than 25% sub 0.75 mm material, and preferably less than 15%, and even more preferably less than 10%.

In one embodiment the containment wall at the water recovery end of the structure is permeable and water drains from the discharge points through the wall.

In another embodiment of the invention, the containment wall at the water recovery end of the structure is not water permeable and water is removed from the contained structure by pumping from a central water discharge point.

Preferably, air access points are provided for the sand channels, either at the deposition end of the structure or by any other means of connection to the air.

Typically, the sand channels are placed such that the maximum distance from any point in the tailings to the nearest sand channel is less than 10 metres, and preferably less than 3 metres, and even more preferably less than 2 metres.

The sand channels may be connected vertically and laterally, to create a 3-dimensional matrix of permeable channels within the tailings.

The sand channels may be between 0.05 and 2 m in depth, preferably between 0.2 and 1 m in depth and even more preferably between 0.3 and 0.7 m depth.

In construction, the continuous sand channels are deposited across the top of a tailings layer.

Typically, the tailings fraction is deposited hydraulically to provide a beaching angle of about 0.5% to 2%, typically 0.5% to 1%, preferably at around 0.5% to provide an adequate slope for the subsequent gravity flow of water through the sand channels to the discharge point.

In one embodiment of the invention, the sand fractions and tailings fractions are deposited sequentially in layers, to form tailings layers that are 1 to 10 m thick, and sand channels that are on average 0.05 to 2 m thick.

In another embodiment of the invention, the sand fractions are deposited in discrete rows spaced apart, and tailings fractions are deposited sequentially in layers, to form tailings layers that are 1 to 10 m thick, and sand channels that are 0.05 to 2 m, typically 0.05 to 1 m thick, and spaced apart by 2 to 10 m, typically 2 to 5 m.

In a further embodiment of the invention, sand is deposited, or geotextile wicking drains or equivalent are placed, such as to form vertical wicking drains in the tailings layers between upper and lower sand channels.

In another embodiment of the invention, sand is used to build internal and external sand bunds. The bunds can be subdivided to form separate containment paddocks, and each paddock is then filled by hydraulic deposition of tailings to the appropriate height, and water allowed to drain into the underlying sand channels and out through the permeable sand bunds to the water catchment point. Then the whole process of placing sand channels and raising the bunds is repeated, to eventually form the desired height and shape of sand and tailings structure.

The sand channels may be inserted in an existing mine tailings storage facility to promote consolidation of the tailings near the containment wall The sand is preferably generated by a separate coarse beneficiation process and the tailings is generated from conventional flotation of the ore.

The coarse beneficiation process may be a coarse particle flotation, screening, gravity separation, electrostatic separation, and magnetic separation, typically coarse particle flotation.

Alternatively, the sand is generated from sand heap leaching, and the tailings is generated from conventional agitation leaching.

DESCRIPTION OF PREFERRED EMBODIMENTS

Figure 1:
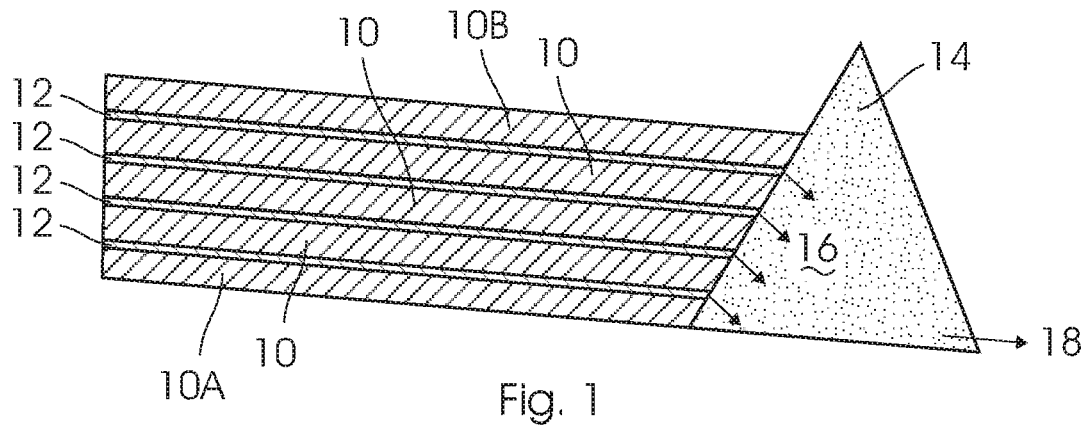
FIG. 1 is a schematic drawing of a multilayer structure according to a first embodiment of the invention.

The current invention utilises the sand fraction of residue generated in mineral beneficiation in a novel tailings storage structure, to recover most of the contained water, and enhance the geotechnical stability of the composite structure, whilst enabling the current practice of low-cost hydraulic placement of tailings to be continued.

By depositing the coarse and fine residues in a structure containing continuous channels of permeable sand through layers of the tailings, most of the contained water in the tailings can drain into the sand in a similar fashion to conventional gravity filtration. The sand channels are deposited to enable the water to migrate by gravity to a discharge point The continuous channels of permeable sand are placed such that the mean path length for water from any part of the tailings to the closest sand channel facilitates the transfer of water from the tailings into the sand channel at an acceptable rate, from where it can be discharged. This distance from any point in the tailings to the closest sand channel, is less than 10 m, and typically less than 5 metres, and enables efficient dewatering of the tailings over a period of weeks and months. The shorter the distance from tailings to dewatered sand channel, the faster the dewatering.

The invention utilises the ore which has been ground to recover the valuable mineral contained therein, separating the residue into sand and tailings fractions. No additional materials are required as the material required for the residue structure can be generated as part of the beneficiation. Albeit that additional permeable material, such as waste rock, or lining materials such as clay or geotextile may be used to supplement containment walls or sand channels.

The water is recovered from the structure through migration along these sand drainage channels, to be either drained through permeable bund walls or by removed by pumping from a central water discharge point. The water is captured for recovery and reuse, or controlled discharge back into the environment, subject to the water quality meeting relevant discharge standards.

For tailings with a low permeability, chemical flocculants may be added prior to deposition of the tailings to enhance their subsequent hydraulic conductivity and hence their dewatering rate.

The drainage rate to a sand channel is faster during the initial stages of tailings drainage, and then continues more slowly over a period of months and even years, as water in the surrounding tailings is progressively displaced by air.

The initially rapid dewatering enables each tailings layer to reach a structural integrity suitable for placement of the sand channels on the surface of the tailings layer. Then the next layer of tailings can be placed hydraulically over the sand channels, and the process continued to build a multilevel structure. The ultimate drainage of the structure enables strengths comparable with an unsaturated soil.

With appropriate bunding to contain the upper tailings deposition layer(s), the residue deposition structure can be adapted to the natural terrain, thus enabling greater flexibility in selecting the location for residue disposal.

As noted, high recoveries of the valuable elements can be maintained whilst generating the sand from the ore, through use of coarse beneficiation techniques. Examples of these coarse beneficiation techniques are coarse particle flotation (CPF), or sand heap leaching (SHL). These techniques provide sufficient sand at a suitable size and quantity.

For example, where CPF is applied to the beneficiation of copper, pgms, gold, or iron ores, depending on the liberation characteristics of the particular ore during comminution, it generates a sand residue at a ratio of (sand/(sand plus tailings)) of between 20-50% of the original ore. The sand residue from coarse beneficiation is typically in the size range of 100-600 microns, and the fines which might otherwise reduce the hydraulic conductivity, have been removed from the sand by the fluidisation that occurs in the CPF process. As such, the CPF residue sand is a permeable and free draining residue.

The 20-50% of permeable CPF sand, provides enough material to allow water transfer to the catchment points, and also to generate such bunding as may be required.

The sand arising from coarse beneficiation and placed in the channels, is well sized for use as a wicking material for dewatering the tailings.

The sand has a high hydraulic conductivity and is readily permeable to the air to displace interstitial water. It can transfer water for long distances, even with a modest head.

The sand is small enough to be deposited hydraulically, and yet settles rapidly enough to be laid down in a targeted channel location, or simply spread to form a continuous, albeit not necessarily uniform, layers over the tailings surface.

Sand's apparent density is similar to the tailings, hence mixing between sand and tailings layers during deposition and draining is limited (for example, the apparent density of a sand or tailings for a copper ore, measured at the point of saturation, will typically be between 2.1 and 2.5 tonne/m$^3$)

The relative sizes of sand and tailings means that fine tailings can't easily occupy the interstices of the sand, hence mixing of the two materials is limited during deposition and subsequent drainage.

The interfaces between sand and tailings form an effective 'filter' zone. This filter allows water to selectively drain from tailings to the sand, just as it would through a sand layer on a mechanical filter device (e.g. U.S. Pat. No. 3,767,050A).

Whilst the sand is preferably generated by a separate coarse beneficiation process, it is also possible to coarsen the grind of the existing beneficiation or leaching process, and then separate the requisite sand fraction from the remainder of the processing residue to form a sand and tailings fraction.

The sand channels are laid such as to allow ongoing air ingress, to promote gravity flow of water from the stored tailings to a manageable number of conveniently located internal collection and dewatering points, or through the permeable bund to external collection points. The ongoing drainage of the submerged tailings layers in the structure is assisted by the pressure of the overlaying tailings and sand layers.

At the end of mine life, the air ingress can be sealed, to avoid any long-term acid generation.

It is noted that no provision is made in the process claimed by Ren et. al., for air access or drainage ports to facilitate recovery of water, or other mechanisms for ongoing displacement of water from the submerged layers within the structure. Due to the low permeability of the overlying tailings, the ongoing displacement of further water from the high permeability layers will be constrained once they are covered. So, whilst Ren's chemical treatment and parallel layered composite design will increase the yield stress of the oil sands tailings structure to meet Canadian Directive 74, it remains far short of the water recovery from mine tailings that can be achieved by other techniques such as filtration and dry stacking of the tailings. Furthermore, a process broadly similar in concept to Ren's could not be applied in the conventional hard rock mining as no suitably permeable sand is generated as part of the grinding and processing route. If grinding were sufficiently coarse to generate enough sand, the conventional recovery of the minerals of value will be curtailed.

The method of the present invention can reduce the water losses in tailings from current levels of around 0.5-0.55 $m^3$/tonne tailings, to typically around 0.1 to 0.15 $m^3$/tonne of residue. Since water losses in tailings represent most of the total water consumed by a hard rock mining operation, this ability to recover water from tailings represents a step change in the mine's overall water consumption.

Methods for the Design and Preparation of the Stack

The current invention consists of multiple steps which make up the method to recover water and create stable landforms from tailings

- Generate a separate suitably sized sand residue and tailings fraction from the ore being processed,
- Deposit the sand residue and tailings fractions separately, to form continuous sand channels within the overall volume of tailings
- Structure the sand channels to allow water to flow by gravity to water discharge points
- Recover the water from these discharge points to enable ongoing drainage of the tailings.
- Progressively build the sand channel/tailings structure and utilise the weight of overlying sand and tailings to accelerate the dewatering of the lower levels of the stored tailings.

Whilst not limited to the specific cases, various examples are provided to illustrate some of the possible designs for the structure, and the various methods by which the structure can be constructed.

The containment walls/bunds that contain the overall structure can take multiple forms.

In one embodiment, the invention can be utilised within a contained dam-like structure such as historically used for tailings storage. This alternative enables high recovery of water. Only a modest proportion of the total tailings are subject to liquefaction at any time, thus reducing the potential for water ingress in the dam wall, eliminating the potential for catastrophic wall failure. This embodiment enhances the safely of upstream dam wall construction. On ultimate mine closure, the tailings within the containment dam will have been dewatered and the storage facility will comparable to an unsaturated soil behind a stable retaining slope.

In another embodiment, the excess sand can be used to build internal and external sand bunds. These bunds can be subdivided to form separate containment paddocks for the structure. A paddock is then filled by hydraulic deposition of tailings to the appropriate height, and water is allowed to drain into the underlying sand channels and out through the permeable sand bunds to the water discharge point. Then the whole process of placing sand channels and raising the bunds is repeated, to eventually form the desired height and shape of sand and tailings landform.

The paddock approach enables shaping of the residue storage bunds to fit the areas and terrain to be rehabilitated. As examples, the stable landform can be revegetated to rehabilitate the mined-out area of land, or for another application that will be useful or aesthetically pleasing to the local community. In both embodiments, water is collected both from the surface runoff during hydraulic deposition, and from the discharge points of the sand channels. The water can then be pumped to a suitable water storage facility, for reuse or disposal.

In construction, the continuous sand channels are deposited across the top of the tailings layer. The natural beaching slope of the tailings, for example 0.5%, provides an adequate slope for the subsequent gravity flow of water through the sand channel. The upper surface of the deposited sand channels does not need to be parallel to the lower surface, which is formed at the beaching angle of the deposited tailings The continuous sand channels can also take various forms.

In one embodiment, the sand can be deposited in discrete sand rows spaced a few metres apart and covering around 20% of the tailings area, or in another embodiment, the sand is deposited such that the channels are joined, and hence form a complete but not necessarily uniform sand layer across the tailings surface.

The key design element for either embodiment is continuity of the sand channels, to enable unhindered drainage through the sand channel to the water discharge point.

There are also possible variations on the depth of both the sand channels and the tailings layers, in the structure.

The preferred design for a particular mine will be a function of the hydraulic conductivities of the sand and the fine tailings, and the terrain to be filled.

The sand depth in each channel will typically be of depth greater than 0.05 m and preferably greater than 0.5 m, to ensure adequate rates of drainage through the sand to the discharge point, and to avoid 'silting up' of the sand channel. This sand channel depth can be readily achieved within the constraint of the quantity of sand generated by coarse beneficiation, and there is no constraint to the upper limit on the depth of sand in a channel.

The depth of each tailings layer will be dependent on the hydraulic conductivity of the tailings, and the time available prior to addition of the next tailings layer. The consolidation rate is a function of the hydraulic conductivity, and in most embodiments, this defines the minimum acceptable time for tailings drainage, prior to adding the next set of sand channels. This in turn sets the maximum rise rate for the structure, that can operate without the need for a fully engineered containment dam wall.

Due to the pressure of the overlying tailings, water can flow to sand channels located above or below or at the side of the tailings.

For typical tailings from a copper resource, the minimum distance from any point in the tailings to the nearest sand channel will typically be between 1-4 metres. However, for finer tailings where rapid dewatering is desirable, the depth of the tailings layer can be reduced. Inversely for a tailings which is more easily dewatered, the optimum depth of the tailings layer can increase to say 10 m or even more.

Typically, the design of the structure will be such that for most of the dewatering period, the rate of water removal will be constrained by the migration within the tailings layer, not the transfer through the sand channels to a catchment point.

To ensure the continuity of sand channels, one possible alternative is the deposition of these sand channels in a multilayer sandwich design and contained by a sand wall, shown schematically in FIG. 1. The multilayer sandwich structure illustrated in FIG. 1 comprises tailings deposited in layers 10, with sand deposited in sand channels 12 deposited in-between, contained by a porous sand or rock wall 14. Water 16 drains along the sand channels 12, through the porous sand wall 14 and is collected in a water catchment 18. Tailings in the tailing layer 10A at the base of the structure are fully consolidated, while tailings in the tailings layer 10B at the top are saturated.

Figure 2A:
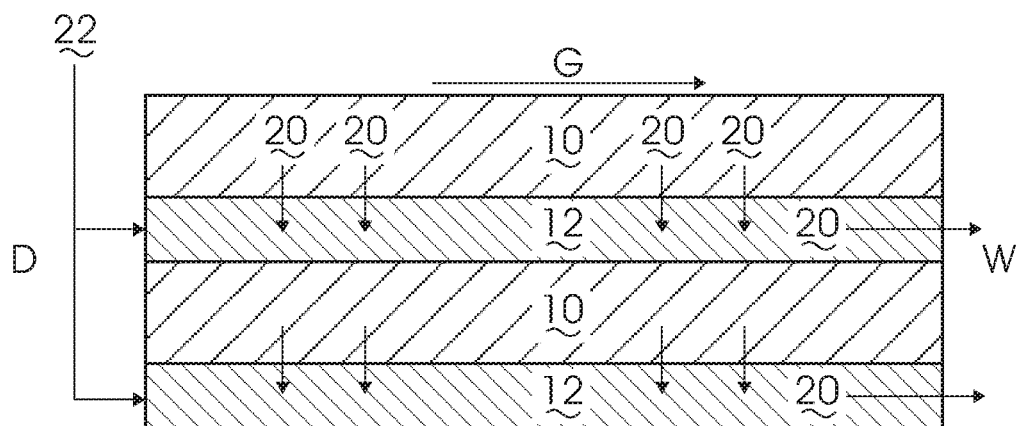
FIGS. 2A and 2B are schematic drawings of a multilayer structure according to a second embodiment of the invention.
Figure 2B:
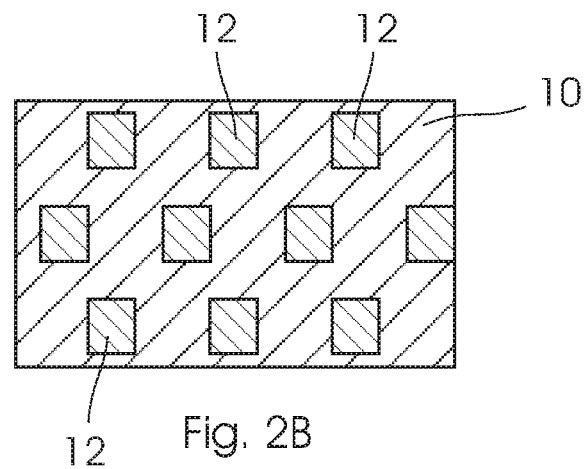

In a second alternative, a series of discrete lateral sand channels can be created through the middle of the TSF. This is illustrated schematically in FIG. 2. With reference to FIG. 2A, tailings layers 10 are deposited on top of porous sand layers 12, with air access 22 at the sand layers 12. Referring to FIG. 2B, sand is deposited in discrete sand rows spaced a few metres apart thereby forming discrete channels 12 in the tailings layers 10. Referring back to FIG. 2A, water 20 flows from the tailings layers 10 into the sand channels 20 and then by gravity flow G from a deposition end D to a water recovery end W of the multilayer structure.

Figure 3A:
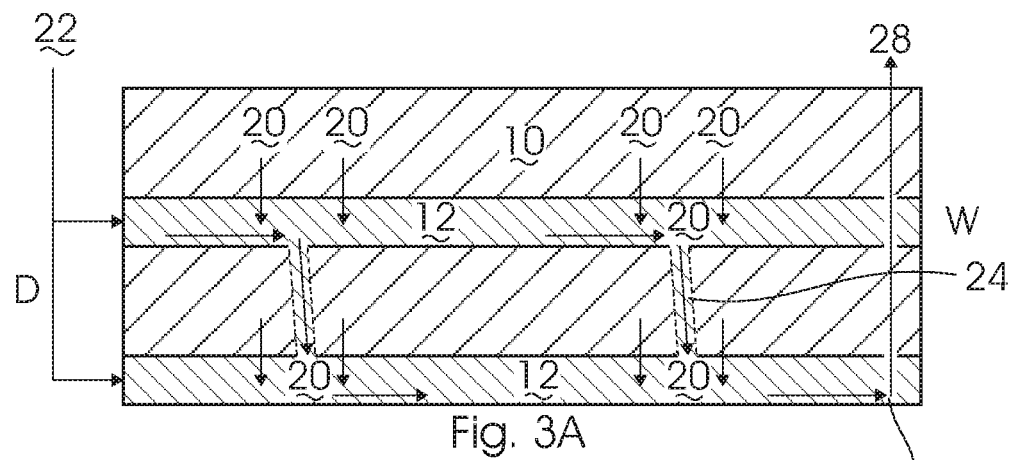
FIGS. 3A and 3B are schematic drawings of a multilayer structure according to a third embodiment of the invention.
Figure 3B:
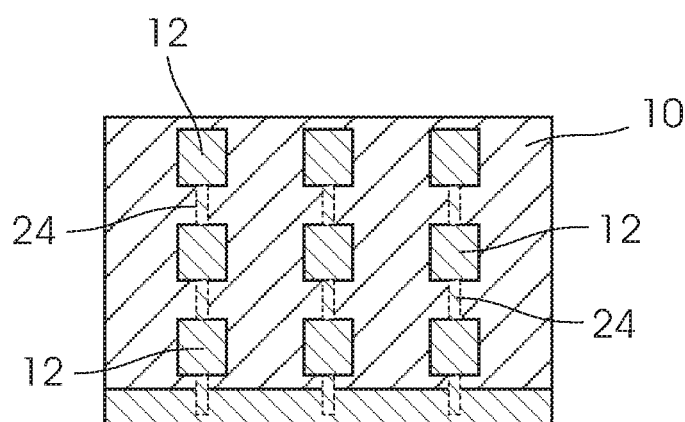

A third alternative design incorporates the additional use of vertical wicking drains, to interconnect the sand channels or layers in three dimensions to promote a more rapid water transfer through the sand is shown in FIG. 3. With reference to FIG. 3A, tailings layers 10 are deposited on top of porous sand channels 12, with air access 22 at the sand channels 12. Referring to FIG. 3B, sand is deposited in discrete sand rows spaced a few metres apart thereby forming discrete channels 12, with vertical wicking drains 24, in the tailings layers 10. Referring back to FIG. 3A, water 20 flows from the tailings layers 10 into the sand channels 20 and the vertical drains 20, and by gravity flow from a deposition end D to a water recovery end W. A discharge pump 26 is located at the water recovery end D to discharge water 28 from the multilayer structure. This 3D structure is particularly useful for very large areas of tailings deposition, or where the sand channels are thin, and where the time required for lateral water flow through the sand channels to a water catchment point can be excessive. The vertical drains 24 facilitate drainage down through the heap and across multiple sand channels 12 to a sand layer at the base of the heap, which can then be dewatered 28.

For any of the possible geometric designs, the effective filter area for the tailings dewatering into the sand channels is large compared to any conceivable mechanical filtration process.

In a further set of embodiments, the deposition of the sand channels on a layer of tailings can be achieved by alternative means.

The sand channels can be placed hydraulically, where the carrier water deposits its sand and then freely drains to the lowest point for recovery. The low hydraulic conductivity of the underlying tailings minimises any impact of hydraulic placement on the overall tailings water content of the partially dewatered underlying structure.

The progressive placement of spigots or hydraulic sand flingers at strategic points across a large TSF, allows hydraulic coverage of the underlying tailings layer at the natural beaching angle of the sand. When the sand beach has the desired depth, the deposition spigot or hydraulic sand flinger is moved, to create the next part of the interconnected network of sand channels. The recently laid sand channels provide the necessary ground stability for the equipment required to move spigots or hydraulic sand flinger. Ongoing tailings deposition can continue in other areas of the TSF, such that tailings are eventually deposited next to and over the sand channels.

Such hydraulic sand flingers are commercially available. Sand with a particle size of p80 350 microns and a water content of around 40% solids may be thrown up to a distance of around 50 m to deposit the sand channels.

Alternatively, the sand deposition can be undertaken mechanically, such as by trucks and dozers, or by mechanical sand-flingers.

Once formed, the sand channels are covered by a layer of tailings, deposited hydraulically in a manner to minimise the disturbance of the sand channels during the early stages of tailings deposition.

For any method of deposition, safe access to the surface of the most recent layer tailings is advantageous to facilitate the deposition of the sand channels.

Figure 4A:
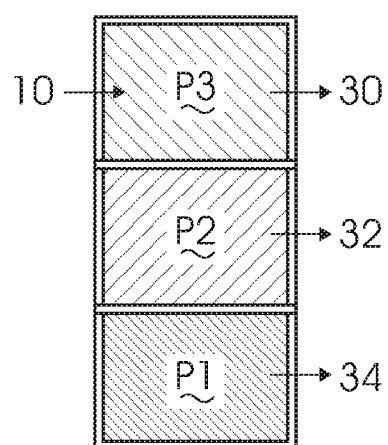
FIGS. 4A and 4B are schematic drawings of a paddock multilayer structure according to a fourth embodiment of the invention.
Figure 4B:
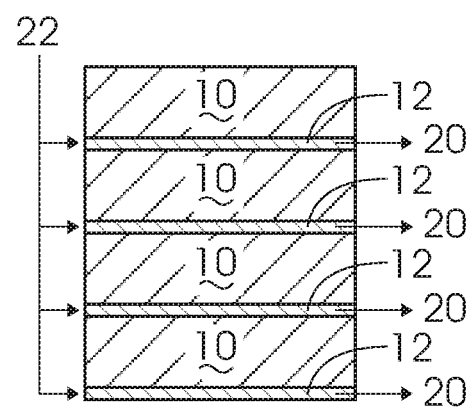

To achieve this, the overall tailings area can be divided into paddocks, such that tailings deposition can occur into the first paddock whilst a second paddock is being drained of surface water to prepare for mechanical sand placement. This drainage can be accelerated by equipment such as the Amphirol (reference 7, 8). The third paddock is where the deposition of sand is being undertaken. An example is shown schematically in FIG. 4. With reference to FIG. 4A, in this embodiment there are three paddocks P1, P2, and P3. At P1, sand is deposited and bunds are raised. At P2, water is draining and a stable tailings surface is prepared, and at P3 tailings 10 are deposited. With reference to FIG. 4B the structure comprises tailings layers 10, porous sand channels 12 with air access 22, and water 20 drains from the channels 12. Referring back to FIG. 4A, surface water 30 is recovered at P1, surface and channel water 32 is recovered at P2, and channel water 34 is recovered at P1. Once each paddock has completed its cycle of deposition or drainage, the activities can be rotated in sequence.

In yet another placement alternative, typically used where the surface of the subaqueous tailings disposal is 'flooded'. An amphibious vehicle deposits the sand, which falls through the overlying water to the surface of the tailings to create the sand channels. Once a continuous sand channel is formed to the collection point, the sand can be covered with another layer of tailings. Once laid, the tailings form a seal from the water at the surface of the dam, the submerged sand channel can be dewatered, along with its under and overlying tailings layer. Whilst not achieving full dewatering, this alternative increases the density of the underlying subaqueous tailings.

In all embodiments, within the stacked layers of tailings and sand, the interstitial water from the tailings is effectively filtered at the interface of the tailings and sand bed, clarifying the water for reuse or disposal.

There are also embodiments in which the structure is utilised to achieve objectives additional to the primary goals of water recovery in a stable form. Modern sensing techniques can be incorporated into the facility; such as fibre optics and remote sensing technology via drone, to monitor the moisture content of the facility in real-time; providing a level of confidence regarding the geotechnical integrity.

This improved control implies that the tailings deposition area can also be designed as a water storage buffer, by adjusting the rate of water reclamation rate from the catchment points.

In a second embodiment of this type, the invention can be used to backfill areas which are mined out, or where a specific landscape is to be formed for aesthetic or practical applications. Examples might be blending in with the natural topography, or formation of agricultural land, or creation of recreational areas for use by the local community.

The invention can also be used to supplement existing TSF practices, or to stabilise historical TSFs. The critical areas in historical TSFs are located adjacent to and within the dam walls, where zones of unsaturated tailings can cause failure of the dam wall, which then releases the large volumes of the contained tailings.

Excess sand from coarse beneficiation can be selectively placed in dewatering channels through the historic TSF, for example by drilling and backfilling the hole with permeable sand. By dewatering these channels, the water content of the tailings close to the wall can be reduced.

If more extensive dewatering and compaction is desired in a historical TSF, the sand curtain of wick drains can be replicated in the third dimension, away from the dam wall.

For an operational TSF, the sand channels described in the current invention can simply be laid down in dewatering channels located the vicinity of the wall. With a 'two-dimensional curtain' of sand wicking channels in proximity to the dam wall, water will flow from any unsaturated zones to a water catchment point, where it can be removed from the TSF. Thus, the invention can dewater the most sensitive zone for tailings dam safety, enabling safe utilisation of upstream dam construction methods.

As mentioned above, a preferred coarse beneficiation process is coarse particle flotation (CPF).

In the case of a coarse particle flotation process:
ore is crushed in a comminution device;
the crushed ore is classified in a classification device to obtain a classified fraction suitable for further comminution, a classified fraction suitable for coarse flotation, and a classified fraction suitable for fine flotation;
the fraction suitable for coarse flotation is subjected to coarse flotation to obtain an intermediate concentrate and a coarse sand residue;
the coarse sand residue is used as the sand fraction to form the continuous channels through the tailings fraction;
the intermediate concentrate is ground to a size suitable for fine flotation;
the classified fraction suitable for fine flotation and the ground intermediate fraction are then subjected to fine flotation to obtain fine tailings that are thickened and deposited in the manner described above.

Through this coarse beneficiation process, high recoveries of the valuable component of the ore are maintained, and a suitable quantity and size of sand residue is created.

Benefits of the Current Invention

The benefits of the invention can either be compared to filtering and dry stacking, or to a conventional TSF method of tailings disposal.

In warm and very dry climates, dry stacking of tailings has been undertaken by placing thin layers (typically less than 30 cm) of non-segregating tailings from a high-density thickener or paste thickener hydraulically, and then allowing them to dry over a period of weeks by evaporative processes, prior to adding the next thin layer of tailings. Water is not recovered using this technique, and the height of the structure is limited. Using the method of the present invention the multilayer structure of tailings can be tens of metres in height, over 50 m or over 100 m in height.

Another method of dry stacking is to filter the tailings to an acceptable water content (typically around 15% by weight) then mechanically convey the solids to a disposal area and stack the partially dewatered tailings. This technique recovers most of the water, but is capital intensive, and the filtered tailings are still liable to 'extrude' if evaporation rates are insufficient. Such filtered tailings require large areas of flat land or to be located within a dam structure to contain the filtered tailings.

Relative to either method of dry stacking, the current invention offers multiple benefits. These include the low-cost hydraulic placement of tailings; the recovery of most of the water; an increased rise rate of stacking; and the geotechnical stability required to build a higher residue structure, and a method which is less sensitive to operational and climatic variation.

Relative to a conventional TSF, the current invention also delivers multiple benefits.

The primary benefit is a reduction in total water consumption. The interstitial water contained in tailings is the major form of water loss at any mine. Depending on evaporative losses, the water consumption in tailings using the current invention will be at least halved, and more likely cut to around 20% of the conventional TSF water loss. Particularly in water deficient areas, this offers the potential to design and operate a mine with a much lower water consumption per unit of metal output.

A second major benefit is the height of unsaturated tailings present at any time during the deposition, eliminating the potential for wall failure and catastrophic liquefaction of the contained mass of tailings. This ability to generate unsaturated tailings reduces the land area which will ultimately be disturbed for placement of residues, and for some mines allows the placement of tailings storage in a location much closer to the processing facility. It also allows safer application of upstream containment bunds.

A third benefit is a permanently stable mine tailings facility. The moisture content and draining characteristics of the invention allow access and revegetation of the surface of the structure. The tailings will have drained sufficiently to behave similarly to other unsaturated soil around the mine. Sulphides content will have been reduced in the sand residue, by coarse beneficiation. At the end of mine life, any further potential for acid mine drainage from the tailings, can be eliminated by sealing the access of air to the sand channels in the tailings.

A fourth benefit is the opportunity to backfill mined-out areas. For strip mining, this will enable a sequential process of mining and placement of the sand channels and tailings layers in the historically or recently mined out areas. For deep open pit mining, the potential exists to recover and replace sand and tailings which have been separately stored, into the exhausted pit at the end of mine life.

A fifth benefit is the ability to deposit tailings and perhaps both sand and tailings hydraulically, without prior filtration and conveying, and still achieve a 'dry water efficient' tailings storage. The capital and operating costs of the hydraulic deposition made possible by the current invention is significantly lower than filtration and stacking using conveyors or trucks.

A sixth benefit is to produce a landform of value whilst disposing of mining residues in a safe and environmentally conscious manner. This might take the form of recreating the original flora, or agricultural or recreational land, or simply more aesthetically pleasing landforms.

A seventh benefit is the flexibility to locate the tailings storage on land adjacent to the processing plant, rather than finding a suitable valley for disposal of the tailings in a conventional tailings storage facility. In so doing, this eliminates the high cost tailings containment wall which must be designed to hold back a liquefiable slurry in perpetuity.

An eighth benefit is to use part of the sand channels to store water for later use, and hence buffer seasonal climatic variation, or other variability in access to water.

EXPERIMENTAL

Experiments were undertaken to recover the values using a mix of coarse particle flotation and flotation, and hence generate a sand residue fraction from the coarse particle flotation and a tailings fractions from the flotation of a Chilean copper ore, and a South African PGM ore.

For both ores, the coarse particle flotation tests were conducted at a grind size where global metal recovery was comparable with that achieved by finer grinding and conventional flotation.

25% of the PGM ore was recovered in the sand fraction, and 35% of the Cu was recovered as sand.

The size distribution of the two fractions, as tabled below, illustrates the effective fines removal from the sand component that occurs during coarse particle flotation, resulting in high permeability of both sands.

The relativity of the sizes of the two fractions meets 'Terzaghi's Filter Criterion' for co-existing as discrete zones, without the permeability of the sand being inhibited by infiltration of excessive fines in the tailings.

|  | Cu Ore sizes (microns) | PGM ore sizes (microns) |
|---|---|---|
| Sand p80 | 600 | 280 |
| Sand p10 | 150 | 120 |
| Tails p80 | 200 | 100 |
| Tails p10 | 3 | 3 |
|  | Cu Ore Permeability (m/s) | PGM Ore Permeability (m/s) |
| Tails | $4.4*10^{-7}$ | $7.2*10^{-8}$ |

Figure 5:
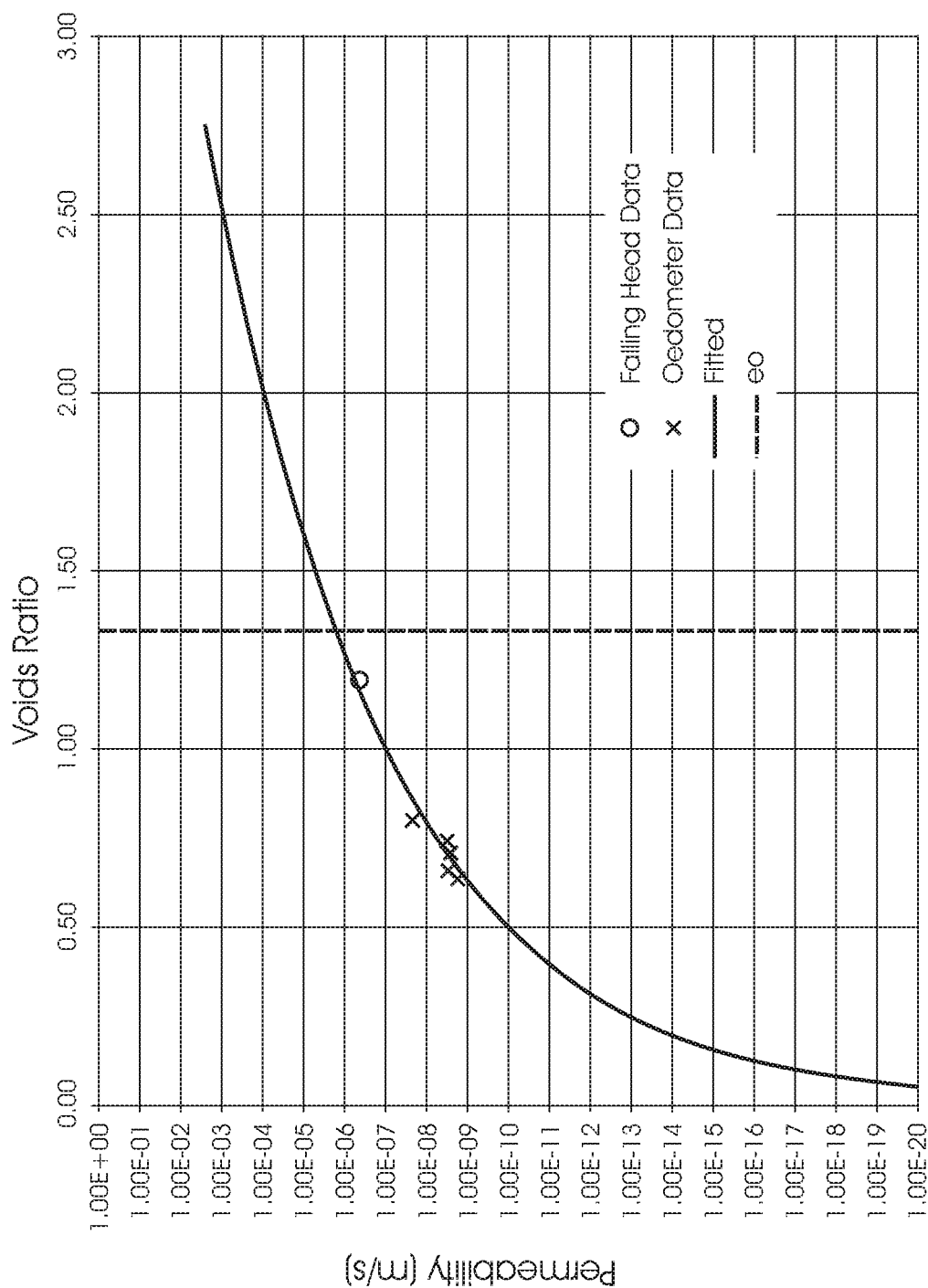
FIG. 5 is graph showing the results from falling head and oedometer laboratory testing of the Chilean copper tailings showing the permeability/void ratio relationship, relevant to predicting water release from consolidating tailings.

Oedometer, drained settling, consolidation and falling head tests were undertaken to characterise both the sand and tails components of both ores. The impact of void ratio of the copper tails on the permeability as obtained during these tests, is shown in FIG. 5.

The test results for both systems were modelled to calculate the maximum thickness of a tailings layer that can be placed, whilst maintaining an acceptable consolidation time for hydraulically dry stacking of a structure. This modelling shows 90% consolidation should occur within 3 months, for a 3 m thick layer of copper tailings and for a 10 m thick layer of PGM tailings. Ongoing dewatering will desaturate the sand and tailings converting the structure into a geotechnically stable soil.

A larger scale three-dimensional pilot test was also carried out to validate the laboratory modelling.

Three layers of 0.35 m thick tailings and 2 layers of 0.2 m sand from the PGM tailings were placed in a 1 m2 square Perspex tank, and allowed to dewater from 4 discharge points located at each edge of each sand layer. Consolidation rate, pore pressures, water content, and discharge rates were measured to confirm the modelling at a slightly larger scale.

The larger scale test demonstrated the ability to maintain the tailings in discrete zones during deposition.

This test also demonstrated the dewatering of the adjacent tailings into the sand layer, and migration to the water discharge points, to achieve consolidation rates consistent with the modelling above.

The water recovered from the sand layer was clear of silt.

REFERENCES

1. Proceedings Tailings and Mine Waste 2015 Vancouver, BC, Oct. 26 to 28, 2015
2. WO2018/234880
3. WO2017/195008
4. U.S. Pat. No. 3,767,050A
5. ICOLD (International Committee of Large Dams) 121 (2001), Tailings Dams Risk of Dangerous Occurrences (Section 2, page 17—"The filter under-drainage system is a critical facility that has often been overlooked in the past, resulting in dangerously high phreatic surfaces within the body of the tailings dam. As is well known, the outer slopes of a tailings dam are very sensitive to the level of the phreatic surface. Capillary rise above the measured position of the phreatic surface can make the tailings in this zone to be close to full saturation. This condition can produce unexpectedly large rises of the phreatic surface from remarkably small amounts of rainfall.")
6. U.S. Pat. No. 9,188,389 B2.

The content of the References cited above are incorporated herein by reference.

The invention claimed is:

1. A method of disposing of residues from the comminution and processing of ores, including the steps of:
classifying the processing residues into a water permeable sand fraction comprising sand particles with a p80 of greater than 150 microns and a tailings fraction comprising particles with a p80 of less than 150 microns;
depositing the tailings fraction and the sand fraction to form a multilayer structure contained by at least one containment wall wherein the sand fraction is deposited in forming continuous channels and tailings layers are deposited hydraulically so that the sand fraction form continuous channels through the tailings fraction, and wherein
air access points are provided for the sand channels to allow water contained in the tailings and sand to flow by gravity, through the sand channels, to water discharge points; and
recovering the water from the water discharge points.

2. The method claimed in claim 1, wherein the sand fraction comprises sand particles with a p80 of greater than 300 microns.

3. The method claimed in claim 2, wherein the sand fraction comprises sand particles with a p80 of greater than 400 microns.

4. The method claimed claim 1, wherein the sand fraction is free-draining.

5. The method claimed in claim 4, wherein water drains by gravity from the sand fraction to form an unsaturated sand.

6. The method claimed in claim 5, wherein the unsaturated sand contains less than 15% water by weight.

7. The method claimed in claim 1, wherein the tailings fraction comprises particles with a p80 of less than 200 microns.

8. The method claimed in claim 7, wherein the tailings fraction has a water content of between 30% and 70% by weight.

9. The method claimed in claim 1, wherein the tailings fraction is treated with chemical additives prior to deposition, to create a more permeable tailings layer, or change the natural beaching angle.

10. The method claimed in claim 1, wherein the sand residue contains less than 25% sub 0.75 mm material.

11. The method claimed in claim 10, wherein the sand residue contains less than 15% sub 0.75 mm material.

12. The method claimed in claim 11, wherein the sand residue contains less than 10% sub 0.75 mm material.

13. The method claimed in claim 1, wherein a containment wall located at a water recovery end of the structure is water permeable and water drains from the discharge points through the wall.

14. The method claimed in claim 1, wherein a containment wall at a water recovery end of the structure is not water permeable and water is removed from the structure by pumping from a central water discharge point.

15. The method claimed in claim 1, wherein the sand channels are placed such that the maximum distance from any point in the tailings to the nearest sand channel is less than 10 metres.

16. The method claimed in claim 1, wherein the sand channels are placed such that the maximum distance from any point in the tailings to the nearest sand channel is less than 3 metres.

17. The method claimed in claim 16, wherein the sand channels are placed such that the maximum distance from any point in the tailings to the nearest sand channel is less than 2 metres.

18. The method claimed in claim 1, wherein sand channels are connected vertically and laterally, to create a 3-dimensional matrix of permeable channels within the tailings.

19. The method claimed in claim 1, wherein the tailings fraction is deposited hydraulically to provide a beaching angle of about 0.5% to 2%.

20. The method claimed in claim 19, wherein the tailings fraction is deposited hydraulically to provide a beaching angle of about 0.5% to 1%.

21. The method claimed in claim 20, wherein the tailings fraction is deposited hydraulically to provide a beaching angle of about 0.5%.

22. The method claimed in claim 1, wherein the sand fractions and tailings fractions are deposited sequentially in layers, to form tailings layers that are 1 to 10 m thick, and sand channels that are on average 0.05 to 2 m thick.

23. The method claimed in claim 1, wherein the sand channels are between 0.05 and 2 m thick.

24. The method claimed in claim 23, wherein the sand channels are between 0.2 and 1 m thick.

25. The method claimed in claim 24, wherein the sand channels are between 0.3 and 0.7 m thick.

26. The method claimed in claim 1, wherein the sand fractions are deposited in discrete rows spaced apart, and tailings fractions are deposited sequentially in layers, to form tailings layers that are 1 to 10 m thick, and sand channels that are 0.05 to 2 m thick, and spaced apart by 2 to 10 m.

27. The method claimed in claim 26, wherein the sand fractions are deposited in discrete rows spaced apart, and tailings fractions are deposited sequentially in layers, to form tailings layers that are 1 to 10 m thick, and sand channels that are 0.05 to 1 m thick, and spaced apart by 2 to 5 m.

28. The method claimed in claim 1, wherein sand is deposited such as to form vertical wicking drains in the tailings layers between upper and lower sand channels.

29. The method claimed in claim 1, wherein sand is used to build internal and external permeable sand bunds, and the bunds are subdivided to form separate containment paddocks, and each paddock is then filled by hydraulic deposition of tailings to the appropriate height, and water is allowed to drain into the underlying sand channels and out through the permeable sand bunds to the water catchment point.

30. The method claimed in claim 29, wherein, at any time during the deposition of layers, only the top 3 tailings layers are saturated with water.

31. The method claimed in claim 29, wherein, at any time during the deposition of layers, only the top two tailings layers are saturated with water.

32. The method claimed in claim 29, wherein, at any time during the deposition of layers, only the top tailings layer is saturated with water.

33. The method claimed in claim 1, wherein the sand is generated by a coarse beneficiation process and the tailings is generated from conventional flotation of the ore.

34. The method claimed in claim 33, wherein the coarse beneficiation process is coarse particle flotation, screening, gravity separation, electrostatic separation, and magnetic separation, typically coarse particle flotation.

35. The method claimed in claim 34, wherein the coarse beneficiation process is coarse particle flotation.

36. The method claimed in claim 1, wherein the sand is generated from sand heap leaching, and the tailings is generated from conventional agitation leaching.

\* \* \* \* \*